(12) United States Patent
Bruckner et al.

(10) Patent No.: US 7,584,491 B2
(45) Date of Patent: Sep. 1, 2009

(54) SYSTEM AND METHOD FOR MANAGING INTERACTIVE PROGRAMMING AND ADVERTISEMENTS IN INTERACTIVE BROADCAST SYSTEMS

(75) Inventors: John Anthony Bruckner, Venice, CA (US); Nizar Allibhoy, Northridge, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 1035 days.

(21) Appl. No.: 09/843,589

(22) Filed: Apr. 25, 2001

(65) Prior Publication Data

US 2005/0015796 A1 Jan. 20, 2005

(51) Int. Cl.
*H04N 7/16* (2006.01)
(52) U.S. Cl. .............................. 725/36; 725/60; 725/61; 709/213
(58) Field of Classification Search ............. 725/32–36, 725/135–142, 109, 110, 112, 131, 132; 709/217–223
See application file for complete search history.

(56) References Cited

U.S. PATENT DOCUMENTS

| | | | |
|---|---|---|---|
| 4,847,698 A | 7/1989 | Freeman | 358/343 |
| 4,847,700 A | 7/1989 | Freeman | 358/343 |
| 5,585,858 A | 12/1996 | Harper et al. | 348/485 |
| 5,734,413 A | 3/1998 | Lappington et al. | 348/12 |
| 5,764,275 A | 6/1998 | Lappington et al. | 348/12 |
| 5,861,881 A | 1/1999 | Freeman et al. | 345/302 |
| 5,872,588 A | 2/1999 | Aras et al. | 348/1 |
| 5,883,675 A | 3/1999 | Herz et al. | 348/465 |
| 5,937,331 A * | 8/1999 | Kalluri et al. | 725/146 |
| 5,991,799 A | 11/1999 | Yen et al. | 709/218 |
| 6,006,256 A | 12/1999 | Zdepski et al. | 709/217 |
| 6,058,430 A | 5/2000 | Kaplan | 709/245 |
| 6,064,440 A | 5/2000 | Born et al. | 348/478 |
| 6,075,568 A | 6/2000 | Matsuura | 348/478 |
| 6,193,610 B1 | 2/2001 | Junkin | 463/40 |
| 6,330,719 B1 * | 12/2001 | Zigmond et al. | 725/121 |
| 6,357,042 B2 * | 3/2002 | Srinivasan et al. | 725/32 |
| 6,460,180 B1 * | 10/2002 | Park et al. | 725/40 |
| 6,698,020 B1 * | 2/2004 | Zigmond et al. | 725/34 |
| 6,791,579 B2 * | 9/2004 | Markel | 709/219 |

(Continued)

OTHER PUBLICATIONS

Enhanced Content Specification v1.1 r26, Advanced Television Enhancement Forum (ATVEF), 1999.*

*Primary Examiner*—Annan Q Shang
(74) *Attorney, Agent, or Firm*—Samuel S. Lee; Procopio, Cory, Hargreaves & Savitch LLP

(57) ABSTRACT

A system and method for managing interactive program and commercial content includes an interactive enabling device which is coupled for receiving a broadcast stream containing interactive program triggers and interactive commercial triggers for retrieving the interactive program and commercial content. At least one interactive content server is coupled to the interactive enabling device for communicating with an interactive control application in the interactive enabling device. The interactive enabling device executes the interactive control application to manage the retrieval of the interactive program and commercial content from the at least one interactive content server in response to the interactive program and commercial triggers. In addition, the interactive control application includes a gatekeeper function for selectively retrieving interactive program and commercial content in response to recognized interactive program and commercial triggers.

36 Claims, 3 Drawing Sheets

U.S. PATENT DOCUMENTS

| | | | |
|---|---|---|---|
| 7,100,193 B2 * | 8/2006 | Hassell et al. | 725/136 |
| 7,174,562 B1 * | 2/2007 | Leak et al. | 725/110 |
| 7,249,366 B1 * | 7/2007 | Flavin | 725/25 |
| 7,313,802 B1 * | 12/2007 | Tomsen | 725/23 |
| 7,320,134 B1 * | 1/2008 | Tomsen et al. | 725/32 |
| 7,350,223 B2 * | 3/2008 | Nishiyama et al. | 725/97 |
| 7,400,711 B1 * | 7/2008 | Ford et al. | 379/70 |
| 2002/0059644 A1 * | 5/2002 | Andrade et al. | 725/136 |
| 2002/0078443 A1 * | 6/2002 | Gadkari et al. | 725/32 |
| 2005/0005303 A1 * | 1/2005 | Barone et al. | 725/110 |

* cited by examiner

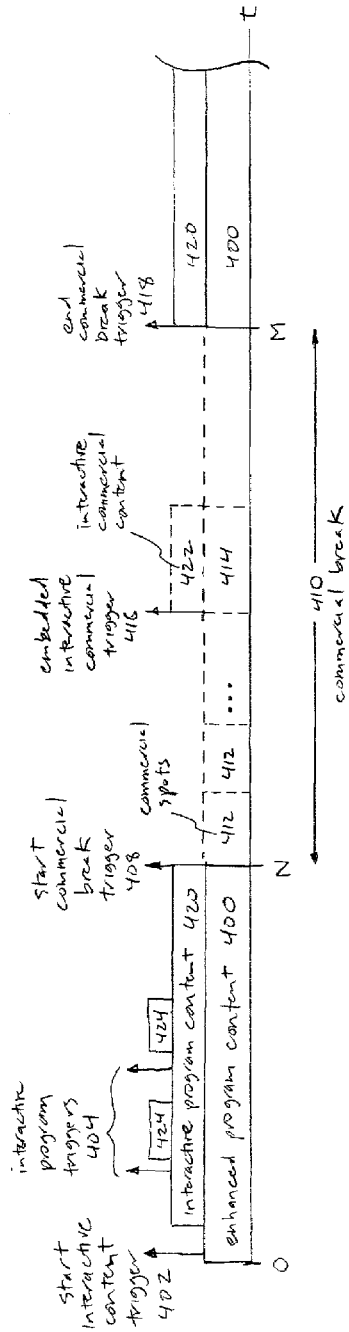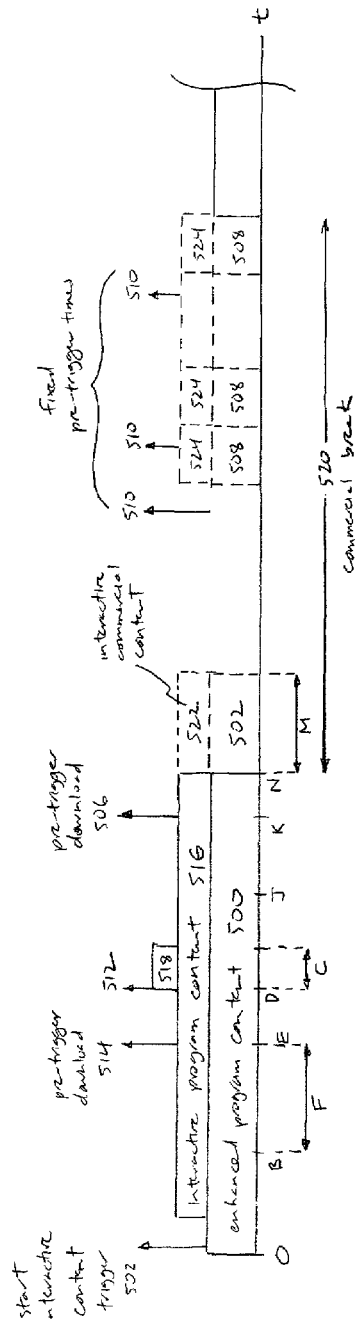

SYSTEM AND METHOD FOR MANAGING INTERACTIVE PROGRAMMING AND ADVERTISEMENTS IN INTERACTIVE BROADCAST SYSTEMS

CROSS-REFERENCE TO RELATED APPLICATIONS

Embodiments of the present invention are related to a U.S. utility patent application entitled "System and Method For Broadcast-Synchronized Interactive Content Interrelated To Broadcast Content," Ser. No. 09/843,397, filed Apr. 26, 2001. The content of that application is incorporated by reference herein.

BACKGROUND OF THE INVENTION

1. Field of the Invention

The present invention relates, generally, to interactive broadcast systems including interactive television (ITV) systems and, in particular embodiments, to such systems and processes for managing interactive advertisements and programming in ITV systems.

2. Description of Related Art

The emerging technology of ITV holds a promise of allowing a television (TV) set to serve as a two-way information distribution mechanism. Proposed features of ITV accommodate a variety of marketing, entertainment, and educational capabilities such as allowing a user to order an advertised product or service, compete against contestants in a game show, or request specialized information regarding a televised program. Typically, the interactive functionality is controlled by a "set-top" decoder box ("set-top box" or "STB") which executes an interactive program written for the TV broadcast. The interactive functionality is often displayed upon the TV's screen and may include icons or menus to allow a user to make selections via the TV's remote control or a keyboard.

The program interactivity may be optional. Thus, a user who chooses not to interact or who does not have interactive functionality included with the user's TV should not suffer any degradation or interruption in program content. In order to provide this option to users, a transparent method of incorporating interactive content into the broadcast stream that carries the program is employed. In the present disclosure, "broadcast stream" refers to the broadcast signal, whether analog or digital, regardless of the method of transmission of that signal, i.e. by antenna, satellite, cable, or any other method of analog or digital signal transmission.

One method of transparently incorporating interactive content into the broadcast stream is the insertion of triggers into the broadcast stream for a particular program. The insertion of triggers into a broadcast stream is well known in the art. Program content in which such triggers have been inserted is sometimes referred to as enhanced program content or as an enhanced TV program or video signal.

Triggers may be used to alert a STB that interactive content is available. The trigger may contain information about available enhanced content as well as the location of the enhanced content. A trigger may also contain user-perceptible text that is displayed on the screen, for example, at the bottom of the screen, which may prompt the user to perform some action or choose amongst a plurality of options. Thus, a user with a TV that has interactive functionality may be prompted at the beginning of an enhanced TV program to choose between interactive and passive (non-interactive) viewing of the enhanced TV program. If the user chooses passive viewing, any further triggers contained in the enhanced TV program may be ignored by the STB and the user will view the program in a conventional way. However, if the user chooses the interactive option, then further triggers embedded in the enhanced TV program at predetermined times in the enhanced TV program may cause the presentation of interactive content to the user.

Triggers may be inserted into the broadcast stream at various points along the broadcast path. FIG. 1 shows a typical broadcast path 200 for program content. Triggers may be inserted into the broadcast stream before broadcast of the content by the broadcast station 202. Thus, these triggers would be part of the broadcast stream received by cable head ends 204 and 206 and further distributed to homes 208 and 210 and their respective TVs 212 and 214. TVs 212 and 214 are provided with interactive functionality by their associated STBs 216 and 218, respectively.

However, triggers may also be inserted at cable head ends 204 and 206, either for the first time or in addition to, or in place of, triggers previously inserted before broadcast from broadcast station 202. Thus, triggers inserted at cable head end 204 may trigger content specifically targeted at homes for which it provides cable service, such as home 208, while triggers inserted at cable head end 206 may trigger content specifically targeted at homes for which it provides cable service, such as home 210. Thus, advertisements or other content may be targeted to specific regions or even specific neighborhoods. This allows for very specific targeted marketing techniques to be applied to the viewing public.

One common method for inserting data such as triggers into an analog video signal is the placement of that data into the unused lines of the video signal that make up the vertical blanking interval (VBI). Closed caption text data is a well known example of the placement of data in the VBI of the video signal. The closed caption text data is typically transmitted during line 21 of either the odd or even field of the video frame in a National Television Standards Committee (NTSC) format. Closed caption decoders strip the encoded text data from the video signal, decode the text data, and reformat the data for display, concurrent with the video data, on a TV screen. Such closed caption decoders process the text data separately from the video signal.

The Advanced Television Enhancement Forum (ATVEF) has defined protocols for Hypertext Markup Language (HTML)-based enhanced TV. These protocols allow the delivery of enhanced TV programs to STBs and other devices providing interactive functionality by various transmission means, including, but not limited to, analog, digital, cable, and satellite. For the NTSC format, ATVEF specifies the type of information that may be inserted into the VBI of the video signal and on which lines of the VBI that information may be inserted. ATVEF specifies line 21 of the VBI as the line for insertion of an "ATVEF trigger," i.e. the information that the STB or other device with interactive functionality interprets to provide interactive features to the enhanced TV program. ATVEF-A triggers comprise a Universal Resource Locator (URL) which provides an Internet address from which interactive content may be downloaded, whereas ATVEF-B triggers themselves can contain interactive content.

While the use of triggers to download interactive content from remote sites, or provide interactive content themselves, is known in the art, any control over such interactivity has been limited to discrete periods of time such as program times or commercial breaks, but not both. Thus, efficiencies that could result from controlling and sharing the given time space, to the extent possible, could not be achieved. A need therefore exists to manage both interactive program content and interactive commercial content, and schedule and integrate interactive content from multiple sources that may or may not be known in advance, without interference.

SUMMARY OF THE DISCLOSURE

Therefore, it is an advantage of embodiments of the present invention to provide a system and method for managing both interactive program content and interactive commercial content, and scheduling and integrating interactive content from multiple sources that may or may not be known in advance, while preventing the interactive program and commercial content from interfering with each other.

It is a further advantage of embodiments of the present invention to provide a system and method for selective recognition of triggers for interactive content according to prior agreements with program and commercial providers, content ratings, geographic region of the viewer, time, day, or other quantifiable feature.

It is a further advantage of embodiments of the present invention to provide a system and method which allows interactive program and commercial content to be pre-cached in advance of the time it is needed, so that it will be available at that time.

It is a further advantage of embodiments of the present invention to provide a system and method which allows the state of a viewer's interactive experience to be saved for a period of time so that if the viewer should return to the interactive program, the viewer's state can be recovered.

It is a further advantage of embodiments of the present invention to provide a system and method which allows the timing of pre-caching of interactive content or the saving of a viewer's state to be randomized, to minimize bottlenecks in the server providing the interactive content or storing the viewers' state.

It is a further advantage of embodiments of the present invention to provide a system and method which embeds triggers and specified time intervals into the broadcast stream to measure viewership and viewing patterns, and allows for programming or advertisements to be adjusted accordingly.

These and other advantages are accomplished according to a system and method for managing interactive program and commercial content. The system includes an interactive enabling device which is coupled for receiving a broadcast stream containing interactive program triggers and interactive commercial triggers for retrieving the interactive program and commercial content. At least one interactive content server is coupled to the interactive enabling device for communicating with an interactive control application in the interactive enabling device. The interactive enabling device executes the interactive control application to manage the retrieval of the interactive program and commercial content from the at least one interactive content server in response to the interactive program and commercial triggers. In addition, the interactive control application includes a gatekeeper function for selectively retrieving interactive program and commercial content in response to recognized interactive program and commercial triggers.

These and other advantages of embodiments of the invention will be apparent to those skilled in the art from the following detailed description of embodiments of the invention, when read with the drawings and appended claims.

BRIEF DESCRIPTION OF THE DRAWINGS

FIG. 3 illustrates a timeline of an example ITV broadcast stream with interactive program and commercial content according to embodiments of the present invention.

FIG. 4 illustrates a timeline of an example ITV broadcast stream with pre-triggering of interactive program and commercial content according to embodiments of the present invention.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. Although an interactive television system is described herein for purposes of illustration and explanation, it should be understood that embodiments of the present invention are applicable to broadcast systems generally, and are not limited to television embodiments. It is to be further understood that other embodiments may be utilized and structural changes may be made without departing from the scope of the preferred embodiments of the present invention.

System Environment

Figure 1:
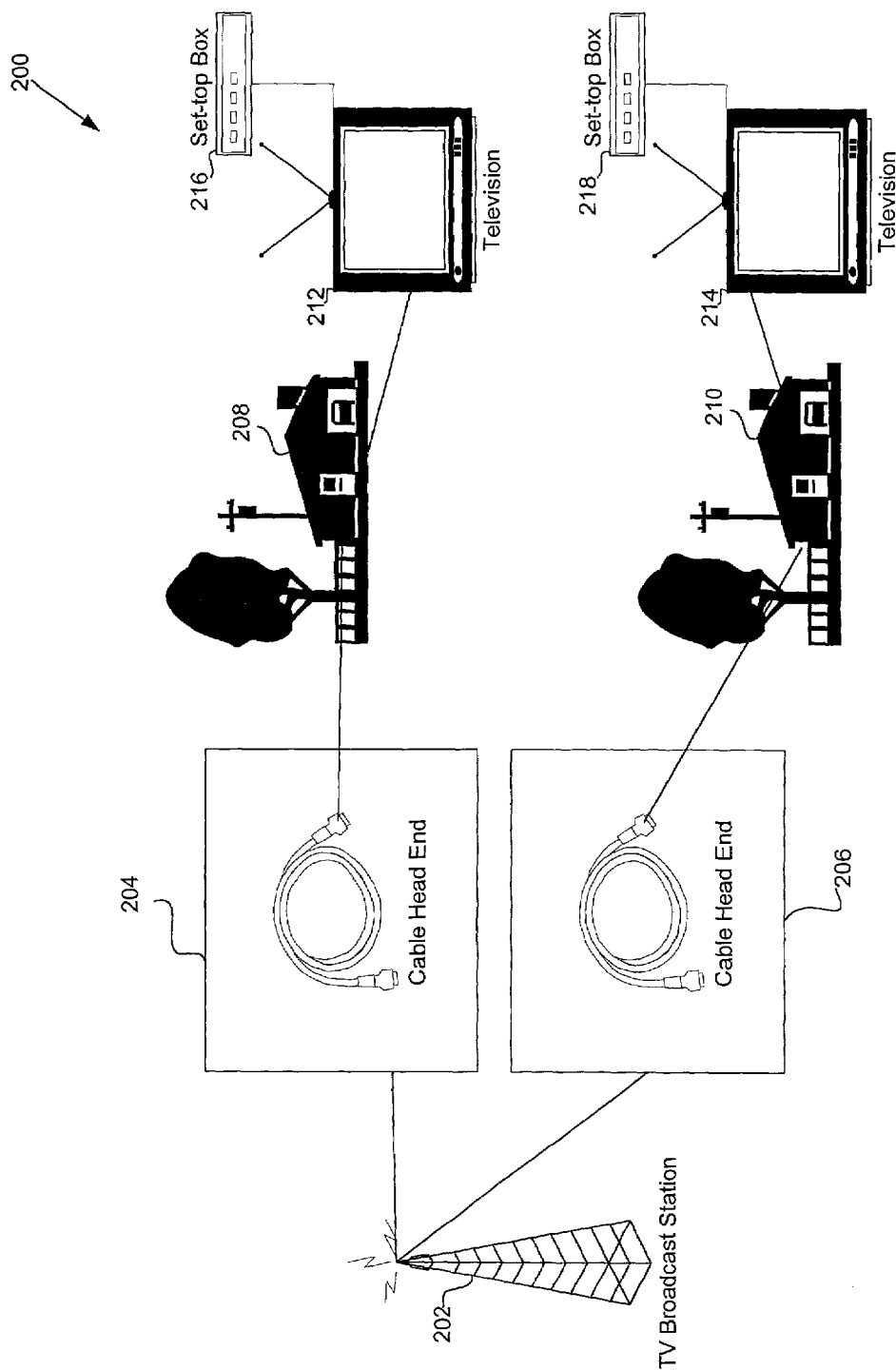
FIG. 1 illustrates a typical broadcast path for program content.
Figure 2:
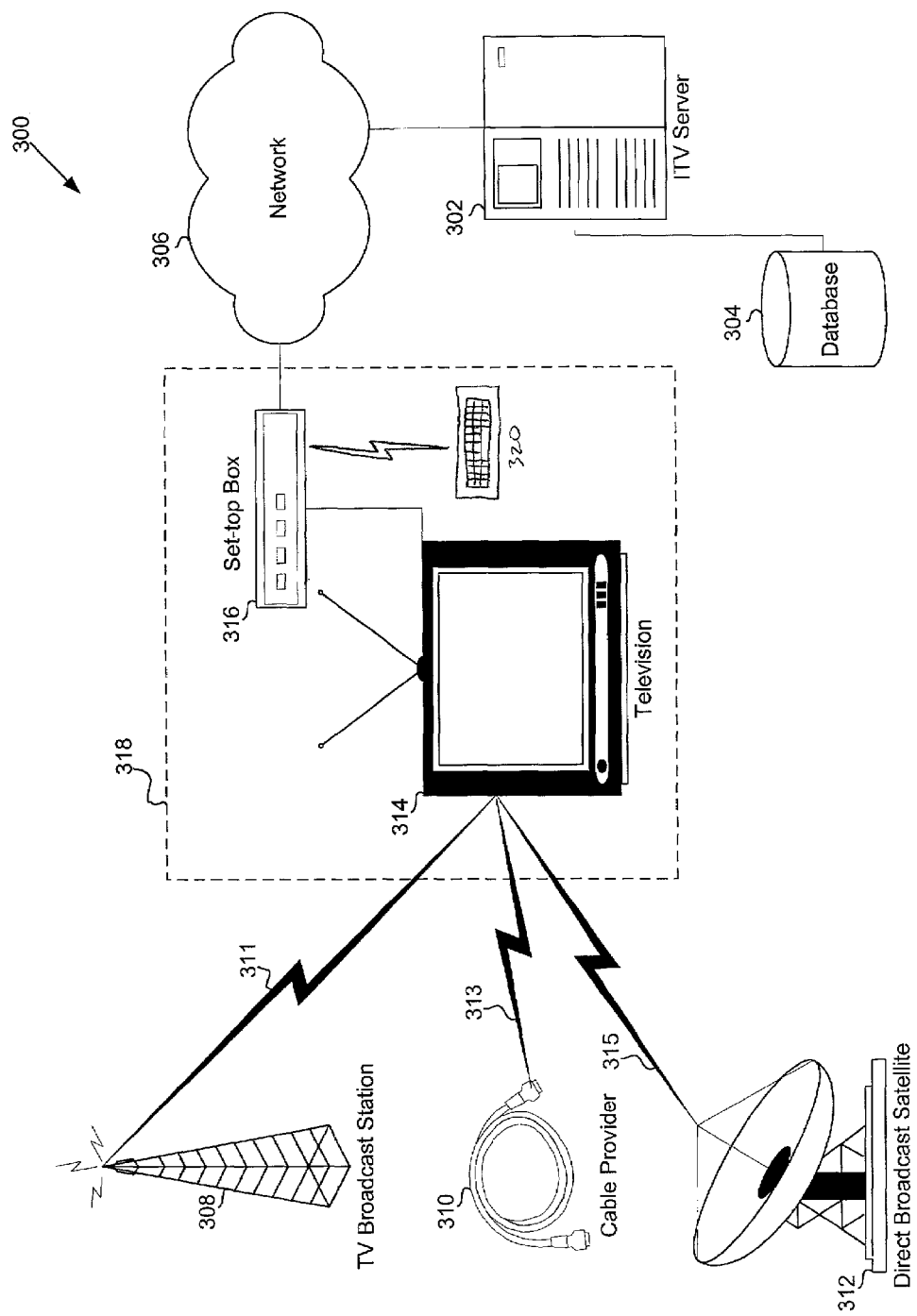
FIG. 2 illustrates an example system hardware environment employed with embodiments of the present invention.

An example system hardware environment employed with embodiments of the present invention is shown in FIG. 2. FIG. 2 shows a system configuration for ITV system 300. An ITV system comprises the following components: one or more ITV servers 302, databases 304, networks 306, broadcast stations 308, cable providers 310, satellite providers 312, TVs 314, STBs 316, and input devices 320.

In the embodiment described in relation to FIG. 2, interactive functionality is provided, on the user end, by an interactive enabling system or device composed of the combination of TV 314 and STB 316. However, any other suitable interactive enabling system or device with a storage device for storing content and/or a play or display mechanism for playing or displaying content to the user may be used, including, but not limited to, a personal computer, personal digital assistants (PDAs), or mobile telephone devices. STB 316 is typically responsive to a user's input device 320 such as a keyboard or remote control, and provides an interactive display output to the user's television display. Alternatively, the interactive content may be viewed on a separate viewing device (not shown in FIG. 2), while the broadcast program may continue to occupy the user's entire TV screen. One advantage of employing a separate viewing device such as a computer is that when a commercial appears on TV, a related commercial can appear on the computer screen.

Although the TV 314 and the STB 316 that make up the ITV in the present embodiment are shown as distinct units, it is understood that in other embodiments the functionalities of TV 314 and STB 316 may be combined and incorporated into one ITV unit. Hereinafter, the interactive enabling system or device on the user end (for example, the combination of TV 314 and STB 316) will be referred to as ITV 318.

The ITV 318 may include a Plain Old Telephone Service (POTS) modem, cable modem, satellite modem, Digital Subscriber Line (DSL) modem, or other broadband communications links or other suitable means of connecting to a network 306. In one example embodiment, network 306 is the Internet and provides ITV 318 with access to the World Wide Web and to a plurality of sources of interactive content. In other embodiments, other communication networks may be used, including, but not limited to, private networks (for example, a network provided by an Internet Service Provider (ISP) for its subscribers), and direct connections (such as a directly wired set of stations in a limited area such as a hotel, office building, educational facility or the like). The ITV 318 may also comprise a local memory for storing programs, interactive content, and data.

An ITV server 302 may provide one source of the interactive content to the ITV 318. The ITV server 302 may comprise one or more processing units, storage systems and many subsystems such as a database subsystem, application processing subsystem, control subsystem and a network 306 access subsystem. ITV server 302 may include or operate with one or more memory devices containing data, such as database 304. Data stored in database 304 may include interactive content such as, but not limited to, a plurality of interactive programs, data for creating or generating text, images, designs or other indicia that compose Web pages, as well as user information, historical activities of users, and other data used by the ITV system 300. In other embodiments, more than one ITV server may be employed, for example, for load distribution or for redundancy in the event that ITV server 302 fails.

In one embodiment, the ITV system 300 allows an enhanced TV program that can be watched on any conventional TV set as a normal program to be combined with interactive program content. As discussed above, in the present embodiment the interactive functionality is provided by STB 316. The STB 316 may incorporate software, hardware, firmware, or combinations thereof that cause interactive content to load within the enhanced TV program. This loading software may be activated by an access code contained within a trigger that has been inserted in the enhanced TV program, as discussed above. The interactive content that is loaded by the loading software may be contained in the ITV 318 local memory or may be downloaded from an ITV server 302 memory device such as database 304.

In one embodiment, the enhanced TV program is provided to TV 314 by TV broadcast station 308 (as shown by reference numeral 311), cable provider 310 (as shown by reference numeral 313), direct broadcast satellite 312 (as shown by reference numeral 315), or other transmission means. In the embodiment shown in FIG. 2, TV 314 is an analog TV and thus suitable analog means of signal transmission have been shown. In another embodiment, TV 314 may be a digital TV and any suitable digital transmission means may be used to deliver the digital signals.

At some point while viewing the normal program, the user may be prompted as to whether the user wishes to begin to interact with the program. In one embodiment, this prompt would be at the beginning of the normal program and would be initiated by a trigger that was synchronized with the beginning of the program.

As discussed above, in one embodiment of the present invention the trigger includes a URL. An example of such a trigger is as follows:

http://www.vip.com/>[s:signal_handler('doSomething')]

This trigger may initiate a prompt for interactive viewing of the television show "V.I.P."™ When a trigger is received by the STB, the ITV executes the Javascript in the body of the trigger. It should be understood that although embodiments of the present invention may be described herein as receiving ATVEF-A compliant URL triggers, other protocols for enhanced TV may be employed and fall within the scope of the present invention. For example, proprietary implementations of enhanced television such as Wink™ and OpenTV™ may also be used. These implementations use triggers which contain interactive content themselves, and use specialized scripts and code as opposed to the HTML/Javascript used in ATVEF.

The URL will cause the ITV 318 to access the particular Internet address associated with that URL. In the present embodiment, the URL will cause ITV 318 to access ITV server 302. ITV server 302 may be programmed to respond to the access code contained within the prompting trigger by downloading the content necessary to display an interactive screen prompt to the user that will prompt the user about interaction with the program. This screen prompt may present to the user user-selectable choices as to whether the user wishes to begin to interact with the normal program.

If the user chooses not to interact with the normal program, the user will continue to view the program as before. If the user chooses to interact with the program, further triggers embedded in the enhanced TV program at designated times may contain access codes which cause new interactive content of arbitrary functionality to be downloaded from ITV server 302 and displayed to the user on TV 314. Thus, the ITV system 300 shown in FIG. 2 allows a user of ITV 318 to receive an enhanced TV program from one source (TV broadcast station 308, cable provider 310, direct broadcast satellite 312) and interactive content from another source (ITV server 302). The interactive content is then incorporated into the enhanced TV program by the ITV 318, thereby allowing the user to experience a fully functional interactive program.

System and device functions and processes described herein may be implemented with machine-executable instructions. Software comprising these instructions may be used to program and cause general-purpose or special-purpose processors (the ITV server processor or processors and the processor or processors within the STB or other interactive enabling device, depending upon the function or process being performed) to perform the functions and processes described herein. Alternatively, such functions and processes may be implemented by firmware, hardware comprising hardwired logic, or by any combination thereof.

Selective Recognition of Program and Commercial Triggers

For purposes of illustration only, a timeline of an example ITV broadcast is illustrated in FIG. 3 according to an embodiment of the present invention. At time t=0, the ITV broadcast stream begins with the transmission of enhanced program content 400. Initially, only the normal program (non-interactive program content) may be displayed on the viewer's screen. However, coincident with or shortly after the start of the normal program, in embodiments of the present invention a start interactive program content trigger 402 embedded in the enhanced program content 400 may cause the ITV to display a prompt on the viewer's screen, asking the viewer if interactive viewing is desired. Such triggers may be referred to herein as an announcement trigger (a call to action by the end user).

If the viewer responds negatively, the normal program will continue to be displayed on the viewer's screen, and any interactive program content that might be available in conjunction with the normal program will not be retrieved by the ITV, or seen by the viewer.

However, if the viewer responds affirmatively, then the ITV will extract the URL from the start interactive program content trigger 402 and retrieve interactive program content 420 associated with the normal program from an ITV server or other remote server. The interactive program content 420 may include one or more interactive HTML pages and an interactive control application (also known as a signal handler). One or more of the HTML pages will be displayed along with the normal program, while the interactive control application, which may be written in a language such as Javascript, will be executed by the ITV to manage all subsequent interactivity. In alternative embodiments, the interactive program content may be assembled from information contained in the broadcast stream. In one embodiment, the interactive control application will invoke a gatekeeper function, which monitors subsequent triggers received from the broadcast stream and determines which triggers will be executed and which triggers will be ignored.

Subsequent embedded interactive program triggers 404 embedded within the broadcast stream, if recognized by the gatekeeper function, may then cause the ITV to retrieve other interactive program content 424 for display along with the normal program, send viewer information back to a Web server, or perform other interactive functions specified in the trigger. It should be understood that, in an example embodiment using ATVEF protocols, the Javascript specified in the URL trigger is not the function itself. Rather, the Javascript just invokes the specified function.

These triggers may be timed to occur at particular time intervals, or may coincide with particular events in the normal program being broadcast. In one example, interactive program triggers may be embedded at five minute intervals to send information on the viewer's interactive viewing habits back to a remote server. In another example, an embedded interactive program trigger may coincide with the first appearance of an actress on the screen, and cause the ITV to retrieve information on that actress and display it on the viewer's screen. In yet another example, an embedded interactive program trigger 404 may coincide with the rolling of credits, and cause the interactive program content to disappear so that the credits may be viewed at full size. Other triggers may cause questions, games, voting choices, advertisements, facts, video, graphics, and the like to appear on the viewer's screen.

Note that embedded interactive program triggers will typically be recognized by the gatekeeper, because the gatekeeper was designed with the embedded interactive program triggers in mind. However, in alternative embodiments, some embedded interactive program triggers may be ignored by the gatekeeper function. For example, some embedded interactive program triggers may contain a content rating such as those currently available for some television programs, based on the interactive program content that would be retrieved based on that trigger. Depending on the time the interactive control application was downloaded by the ITV, or on content rating settings entered into the ITV by adults, the ITV may choose to ignore certain embedded interactive program triggers 404 due the possibility that the interactive program content may be unsuitable for younger children. Alternatively, particular events in the normal program being broadcast may contain several triggers, each having a different content rating. Based on the current time or content rating settings entered into the ITV, one trigger may be received while the others are ignored, and thus the viewer may see different interactive content depending on the time or the content rating setting.

In other embodiments, several triggers may be embedded at particular events or times in the normal program being broadcast, each trigger specific to a different geographic region, time, day, or other quantifiable feature. For example, assume that at a particular time in a program, the scene is an extravagant gambling casino. During production, multiple triggers were embedded at that particular time, one specific to the west coast, one specific to the east coast. The ITV of a west coast viewer may configure its gatekeeper function such that only the west coast trigger will be recognized by the gatekeeper, resulting in the downloading of information about Las Vegas. Conversely, the ITV of an east coast viewer may configure its gatekeeper function such that only the east coast trigger will be recognized by the gatekeeper, resulting in the downloading of information about Atlantic City. In another example, multiple triggers may be embedded in a program so that the ITV of a viewer may recognize only those triggers that correspond to a particular time window or day, so that interactive content may be tailored to viewership patterns in particular time periods or days.

While the interactive program content is being displayed, viewers may select different menus, answer questions, view other interactive program pages, and perform other interactive tasks. Such activity is received by the ITV. The interactive control application may respond to this activity by retrieving information and other interactive program content from a remote server, or sending information to the remote server.

At time t=N, a start commercial break trigger 408 embedded in the broadcast stream indicates that a commercial break 410 has been reached. Such triggers may be referred to herein as control triggers (instructions on how to handle various control tasks). A commercial break 410 may comprise multiple segments or spots 412, which advertisers may purchase for the purpose of running televised commercials. As discussed above, some national commercials are inserted into the broadcast stream at the time or production of the program, others may be inserted post-production, and other commercials (by local advertisers, for example) may be inserted in real time at cable company head ends. Thus, the content of the advertisements within the commercial break 410 may vary based on geographic location.

A commercial break 410 may contain both regular, non-interactive commercials and interactive commercials. Interactive commercials contain triggers for retrieving the interactive commercial content. In one embodiment of the present invention, if a viewer has been viewing interactive program content, then interactive program triggers, if recognized by the gatekeeper function, will automatically result in interactive commercial content being displayed along with the normal commercial. In other embodiments, even though a viewer has been viewing interactive program content, the ITV will prompt the viewer to ask whether the viewing of interactive commercial content is desired. Once the start commercial trigger 408 is received by the ITV, the interactive control application continues to run, but becomes latent, or not visible, to the TV screen. The normal program and the interactive program content disappear, and the full screen is made available for commercials. The interactive control application will remain latent throughout the commercial break period, which is a known period of time. As illustrated in FIG. 3, during the latency time of the commercial break 410, the interactive control application waits for, and may receive, embedded interactive commercial triggers 416 from certain commercials 414 with enhanced commercial content. For example, an embedded interactive commercial trigger 416 for retrieving interactive commercial content from a particular URL may appear as follows:

http://www.vip.com/[s:ad_control_start('code#')].

In this example, the function "ad_control_start" may cause the ITV to download interactive commercial content for a particular commercial, and from a particular location, as identified by code#. Note that in one embodiment of the present invention, the only triggers that are recognized by the interactive enabling device after interactivity has been initiated are those with the same domain as the trigger that initiated the interactivity (the first trigger). Any trigger received after the first trigger and having a domain different from the first trigger will be ignored. Thus, the example trigger above will be recognized if the first trigger initiated interactive viewing of the television show "V.I.P."™ The URL for retrieving the interactive commercial content is therefore ascertainable from the code#. In one embodiment of the present invention, a lookup table may be used to related code#s to URLs. However, by prior agreement between advertisers and the broadcast station, only certain triggers will be recognized by the gatekeeper function.

In addition, other criteria may also be used for recognizing triggers. For example, the gatekeeper may be configured to only allow the downloading of interactive commercial content from national advertisements, or give preferred treatment to national advertisements. As with interactive program content, content ratings or multiple triggers may be embedded into interactive commercials based on geographic region, time, day, and the like, to selectively provide interactive commercial content.

When a recognized embedded interactive commercial trigger is received, the interactive control application will extract the URL information from the trigger and retrieve the interactive commercial content 422 from, for example, a remote web site. Once retrieved, the interactive commercial content is displayed along with the normal commercial.

When the time for interactive commercial 414 is over, another trigger called "ad_control_end" will be received by the interactive enabling device:

http://www.vip.com/[s:ad_control_end('code#')].

This trigger will cause the ITV to terminate the display of the interactive commercial content, regardless of the state of the interactive commercial content. This trigger is useful because of the time uncertainty involved in interactive commercial content. For example, the interactive commercial assets may be so large that downloading them may take an excessive amount of time, the assets may include a form that would take 10 minutes to fill out, or the like.

At time t=M, an end commercial break trigger 418 embedded in the broadcast stream is received by the ITV, and signifies that the commercial break 410 is terminated. The interactive control application ends its latency period, and the enhanced program content 400 and the interactive program content 420 reappear. Furthermore, any interactive commercial content that is still running at time t=M is terminated. Alternatively, there may be contractually agreed-upon rules associated with certain activities. For example, assume that the last commercial within the commercial break is an interactive commercial which provides the user with a form for buying an automobile online. The automobile seller may enter into an agreement with the broadcast station to not terminate the interactive commercial content if a viewer was in the process of completing the form. When the form is complete, the interactive commercial will terminate and the viewer will again see the broadcast program, in progress.

Pre-Caching of Interactive Program and Commercial Content

For purposes of illustration only, a timeline of an example ITV broadcast is illustrated in FIG. 4. At time t=0, the ITV broadcast stream begins with the transmission of enhanced program content 500 and, assuming that the viewer has requested interactive viewing, interactive program content 516. During time period C, it is desirable that additional interactive program content 518 be viewed along with the normal program and interactive program content 516. However, sufficient time must be provided for the interactive program content 518 to be downloaded in advance of t=D. This may be problematic because the interactive program content (assets) can be very memory intensive, and because the assets cannot be properly viewed until all of the assets have been downloaded. For example, assume that an actress is appearing on the normal program during time period C, and the interactive program content 518 to be displayed during time period C is a video clip of that actresses' next movie. The downloading of this video clip may need to be started well in advance of t D, in order to be ready by the beginning of time period C.

At time t=N, a commercial break 520 is reached, and the first commercial is interactive commercial 502. During time period M, it is desirable that interactive commercial content 522 be viewed along with the normal commercial. However, as with interactive program content 518, sufficient time must be provided for the interactive commercial content 522 to be downloaded in advance of t=N. There may not be enough time within time period M to establish a connection with a remote Web site and download the interactive commercial content, especially if the interactive commercial content is desired immediately at t=N.

Thus, embodiments of the present invention allow interactive program and commercial content to be downloaded in advance of the time it is needed, by the insertion of pre-triggers, so that the content will be available at that time. This process may also be referred to herein as pre-caching or pre-rolling of assets.

In order to pre-cache interactive program and commercial content, the time at which it is needed must be known. This time at which interactive program content is needed is generally known in advance, because the timing of events that coincide with the corresponding interactive program content is fixed at the time of production. In addition, because most advertisers have their interactive commercials inserted into the broadcast stream prior to broadcast, the timing of those interactive commercials is generally known in advance. For interactive program and commercial content known in advance, in one embodiment of the present invention the appropriate code numbers are added to a list of approved code numbers, so that the interactive enabling device will recognize the pre-triggers when they occur.

However, some commercial slots may be reserved for local advertisers who may have their commercials inserted into the broadcast stream at local cable company head ends, for example, without much advance notice, or may even have their commercials inserted in real time during the broadcast. For those commercials that might be inserted at the last minute, the advertiser would have to make pre-arrangements with the broadcast station, so that the gatekeeper function will recognize pre-triggers for that commercial, should they be received. For interactive commercial content inserted in real-time or without much advance notice, in one embodiment of the present invention a lookup file containing a list of pre-approved code#s may be examined so that the interactive enabling device will recognize the pre-triggers when they occur. Note that in this embodiment, the lookup file contains, by pre-arrangement, code#s for the interactive commercial content that may be inserted at the last moment.

However, it should be further understood that embodiments of the present invention also allow an advertiser to change interactive commercial content at any time in advance of the broadcast without adding new code#s to the lookup file. By changing interactive commercial content at a remote server identified by a code# in advance of the pre-trigger, the content can be changed without having to change the pre-trigger.

Furthermore, in order to pre-cache interactive program and commercial content, the speed of the download connection may be measured or estimated. To quantify the speed of the download connection, embodiments of the present invention may employ user-configurable settings to identify whether the link to the interactive assets is via a POTS modem, DSL modem, cable modem, satellite modem, and the like, and download speeds can thereafter be estimated accordingly. Alternatively, a sensing system may be employed which measures previous download performance, the round-trip time of a cookie, and the like to empirically measure download speeds.

In the case of interactive program and commercial content inserted in advance of the broadcast time, because the need time for that content is known well in advance, in theory the interactive program or commercial content may be pre-cached at any time in advance of the need time. However, because the amount of memory available to an ITV is fixed, and this memory may be used, among other things, to store both interactive program and commercial assets, it may not be prudent to attempt to pre-cache interactive program assets too far in advance of the need time, because other interactive program and commercial assets having an earlier need time should have a higher priority for pre-caching assets into the limited memory available. Therefore, embodiments of the present invention determine a worst-case latest sufficient pre-cache time for a particular interactive program asset, and pre-cache the interactive program asset at that time. In other words, the present invention will attempt to wait as long as possible before pre-caching, while still ensuring that all of the interactive program assets are likely to be pre-cached before they are needed.

In one embodiment of the present invention, for each segment of interactive program or commercial content needed, one or more pre-triggers may be inserted by the broadcast station or local node for pre-caching the content. If one pre-trigger is inserted, it will generally correspond to the slowest expected download connection speed. If multiple pre-triggers are inserted, each pre-trigger corresponds to a particular type of download connection speed. Thus, there may be separate pre-triggers for a broadband communication link and a POTS modem, each corresponding to an estimated connection speed. Generally, therefore, broadband link pre-triggers will occur later than telephone modem pre-triggers. The broadcast station or local node will use an estimate for connection speed and size of the asset to compute a pre-trigger time and insert the pre-triggers in advance of the asset need time. When these pre-triggers are received by the ITV, the interactive assets will be downloaded and pre-cached, so that they will be available when needed. This embodiment will generally provide conservative estimates, with all pre-trigger calculations being performed by the broadcast station. For example, FIG. 4 illustrates that interactive program content 518 is needed at t=C. One or more pre-triggers 514 may be inserted into the broadcast stream sometime in advance of t=C. If multiple triggers are employed, each pre-trigger corresponds to a different download speed or connection. In addition, multiple unique segments of interactive commercial content 524 are needed at various times during the commercial break 520. One or more pre-triggers 510 may be inserted into the broadcast stream in advance of the need time for each segment, each pre-trigger corresponding to a different download speed or connection.

In FIG. 4, note that because the enhanced program content 500 is broadcast to multiple viewer ITVs, the ITVs will typically receive the same pre-triggers at approximately the same time, and will want to pre-cache interactive program content 518 starting at t=E. The one or more servers containing the interactive program content 518 may be overwhelmed with simultaneous requests for those assets, resulting in bottlenecks and response times which may be much slower than estimated or measured. To reduce this problem, embodiments of the present invention employ a randomizer function in the ITV. The randomizer creates a window of time within which a particular ITV will actually request content from the server, and randomly assigns a time within that window for each request for interactive program content 518. Thus, even though requests from all ITVs for interactive program content 518 should optimally be sent to the remote server at time E, due to the randomizer the requests are actually be sent out at a random time within time window F. Requests received by the server within window F should still give provide time for every viewer's request to be serviced prior to t=D.

Saving and Recovery of a Viewers' State

During a viewer's participation in an interactive program broadcast, the interactive control application may collect data on the viewer's participatory habits, including menu selections, responses to questions, and the like. In conventional interactive programs, when a viewer changed channels or turned off the TV during the middle of the interactive program, the viewer lost the current state of his interactivity, and upon return, had to restart the interactive program "from scratch." Such interactive programs would not remember the identity of the viewer, what the viewer last voted on, what questions were answered, and the like. In the past, viewer information may have been saved to a remote server, but only at the end of the interactive program. The viewer could, at a later time, access the remote server and review the information.

Embodiments of the present invention utilize state-saving triggers embedded at predetermined (time correlated) intervals during the interactive program to cause the ITV to periodically save the "state" of the viewer to a remote server or other memory location such as, but not limited to, memory within the interactive enabling device. Alternatively, the state may be saved at certain times such as the beginning of a commercial break (event correlated), a change in scene or story line in the broadcast program, at the end of the program, or the start of a new game or interactive function. As described above, a "randomizer" may be used to randomly skew each viewer's request to save state to one or more remote servers, to minimize bottlenecks and maximize response times.

Because the viewer is identifiable due to personal login identifiers or ITV source information appended to communications from the viewer's ITV, the state contains information particular to that viewer. This information may include accumulated points and coupons, responses to questions or voting, the time at which the viewer turned the program on or off, the time at which the viewer turned the interactivity on or off, what trigger detected that (e.g. elapsed time from beginning of program), how long the viewer watched the program, and the like. Saving a viewer's state is critical in game show programs, where cheating is a problem. The state is able to identify how far a user has gotten into the game show program, so that if a viewer using TIVO™, for example, rewinds and replays a portion of a game show to provide a correct response, the broadcast station will be able to determine that the viewer had obtained an unfair advantage.

Embodiments of the present invention provide for different levels of state, to avoid capturing and saving too much information. In various embodiments, all parameters may be saved, only certain parameters from a master list of parameters may be saved, or only differences from the previous state may be saved, depending on the type of program. For example, for a game show with prizes, to promote fair competition a lot of data may need to be captured, while for dramas or comedies, the saved state can be just enough to give the viewer a good interactive experience, and enough to restart a viewer's interactivity from its previous position, should the viewer leave the program and then return. Note that a viewer's state may be maintained independent of how often information is uploaded back to the remote server. In other words, an aggregation of information representing the state may be continuously maintained by the ITV over the course of one minute, but the state may be uploaded to a remote server only at the end of that minute.

The state information may be saved only until the end of the program, or may be kept longer (e.g. a week, an entire season, etc.) Upon the viewer's return to that program, the viewer may receive a prompt, asking whether the viewer wants the state restored. If the viewer replies affirmatively, the ITV will access the remote server and download the state information to the ITV. If the viewer replies in the negative, the viewer can start anew. Because a viewer's state is saved to a remote server, the viewer's state is portable across multiple types of STBs or interactive enabling devices. Thus, a user may start an ITV or other interactive broadcast session on one device and complete the session on another device, at different times or days, and in different locations, or carry point scores, responses, etc. to other devices.

Time-Correlated Triggers for Measuring Viewership and Viewing Patterns

Aside from enhancing a viewer's entertainment experience, interactivity allows a broadcast station to obtain information not normally available to them, such as how the viewer is behaving during the interactive program. Such information is not available from passive viewers of a program, and thus information on passive viewing is currently available only through statistical Nielsen ratings. Actual viewership information can be of great value to program creators, owners, and advertisers.

Embodiments of the present invention embed viewership triggers at specified time intervals into the broadcast stream to measure viewership and viewing patterns. The present invention takes advantage of the fact that there is information inherent in time-correlated viewership triggers, though not specifically part of the trigger. For example, for so long as state-saving requests to a remote server or other memory location such as, but not limited to, memory within the interactive enabling device (caused by the viewership triggers) are received from a particular ITV as a viewership indicator, it can be inferred that the viewer was watching at that time. From noting the viewership indicators and when they occurred, a broadcast station can determine who was watching interactively, for how long, start and stop times, periods when the viewer did not watch interactively, and the like.

A broadcast station may therefore be able to determine how many viewers were watching interactively during certain times of the program itself, such as during prologues, the opening credits, epilogues, closing credits, scenes from the next show, etc., and modify normal program content accordingly. Other state information that may be obtained includes which of the interactive menus the viewer was in, for how long, etc. so a broadcast station can adjust its interactive program content accordingly, raise advertisement fees in the more popular options, and the like.

It can also be determined how many viewers watched interactively throughout the playing of a commercial, information that may be very valuable to the advertiser and broadcast station. This determination can be made by monitoring triggers that occur during the commercial break, whether they are triggers for interactive content triggers, or "background" viewership triggers inserted into the commercial break by the broadcast station. Any triggers that occur during the commercial break, while the viewer is in interactive mode, must coordinate with the interactive control application. With actual viewership information available, an advertiser may enter into an arrangement to pay the broadcast station according to the number of viewers that watched their interactive advertisement.

The viewership information can also be used in real time. For example, advertisers may enter into agreements such that advertisers may run their interactive commercial content only if a threshold number of interactive viewers is reached, and if the threshold is not reached, the less expensive normal commercial would be run. This can be accomplished by communicating the viewership information back to the ITVs, who will then adjust their gatekeeper functions to either recognize embedded interactive commercial triggers or not. Alternatively, advertisement slots may be tiered according to viewership, priced accordingly, and sold to the highest bidder. For example, for a particular advertisement slot run during a popular program, there may be five tiers: (1)>1,000,000 viewers, (2) between 750,000 and 1,000,000 viewers, (3) between 500,000 and 750,000 viewers, (4) between 250,000 and 500,000 viewers, and (5)<250,000 viewers. Each tier could be sold to the highest bidder, and as the viewership is measured in real-time and a viewership tier determined, only one advertiser's commercial would run, and only that advertiser would be charged according to his bid. A large number of insubstantial variants to this per-viewer advertising scheme are possible, and fall within the scope of the present invention. However, it should be understood that the embodiments described above only assess interactive viewership. A viewer may choose to cease interactive viewing but continue to watch a program, and data would cease to be collected on this viewer.

Therefore, embodiments of the present invention provide a system and method for managing both interactive program content and interactive commercial content, and scheduling and integrating interactive content from multiple sources that may or may not be known in advance, while preventing the interactive program and commercial content from interfering with each other. Triggers for interactive content can be selectively recognized according to prior agreements with program and commercial providers, content ratings, geographic region of the viewer, time, day, or other quantifiable feature.

In addition, embodiments of the present invention provide a system and method which allows interactive program and commercial content to be pre-cached in advance of the time it is needed, so that it will be available at that time, and which allows the state of a viewer's interactive experience to be saved for a period of time so that if the viewer should return to the interactive program, the viewer's state can be recovered. The timing of pre-caching of interactive content or the saving of a viewer's state can also be randomized, to minimize bottlenecks in the server providing the interactive content or storing the viewers' state.

Embodiments of the present invention also provide a system and method which embeds triggers at specified time intervals into the broadcast stream to measure viewership and viewing patterns, and allows for programming or advertisements to be adjusted accordingly.

What is claimed is:

1. An interactive enabling system for managing interactive program content associated with enhanced program content and interactive commercial content associated with commercial spots, the system comprising:

an interactive enabling device coupled for receiving a broadcast stream, said broadcast stream including the enhanced program content in series with the commercial spots, the broadcast stream further including program pre-triggers, interactive program triggers, commercial pre-triggers, and interactive commercial triggers for retrieving the interactive program content and interactive commercial content; and at least one interactive content server coupled for communicating with an interactive control application in the interactive enabling device;

wherein the interactive enabling device executes the interactive control application to manage the retrieval of the interactive program and commercial content from the at least one interactive content server in response to the program and commercial pre-triggers and make available the interactive program and commercial content in response to the interactive program and commercial triggers, wherein the interactive program and commercial content includes a plurality of segments, each segment including multiple pre-triggers, and each pre-trigger of the multiple pre-triggers for a segment corresponding to a particular type of communication link speed, wherein the interactive enabling device is operable to respond to a commercial pre-trigger embedded in the enhanced program content and a program pre-trigger embedded in a commercial spot, wherein the interactive control application includes a gatekeeper function for selectively retrieving interactive program and commercial content in response to recognized interactive program and commercial triggers, and wherein the interactive enabling device is configured for receiving and responding to the program pre-triggers, the interactive program triggers, the commercial pre-triggers, and the interactive commercial triggers embedded in the broadcast stream to ensure that the interactive program and commercial content do not overlap and interfere with each other.

2. The system as recited in claim 1, wherein the interactive enabling device retrieves the interactive program and commercial content from the at least one interactive content server through a communication link or assembled from information in the broadcast stream.

3. The system as recited in claim 1, wherein the gatekeeper is configured to recognize the interactive program and commercial triggers based on agreements between broadcasters and program or commercial sponsors.

4. The system as recited in claim 1, wherein the gatekeeper is configured to recognize the interactive program and commercial triggers based on parameters embedded within the interactive program and commercial triggers.

5. The system as recited in claim 1, wherein the gatekeeper is configured to recognize the interactive program and commercial triggers based on parameters maintained within the interactive enabling device.

6. The system as recited in claim 1, further comprising:

a plurality of additional interactive enabling devices in addition to said interactive enabling device, each of said plurality of additional interactive enabling devices coupled for receiving the broadcast stream;

wherein the interactive enabling device and each of the additional interactive enabling devices includes a corresponding randomizer for randomly time-skewing the retrieval of the interactive program and commercial content in response to the interactive program and commercial triggers.

7. The system as recited in claim 1, wherein the broadcast stream further includes interactive program pre-triggers for triggering the retrieving of corresponding interactive program content in advance of when a portion of enhanced program content of the enhanced program content that is associated with the corresponding interactive program content is received in the broadcast stream;

wherein the broadcast stream further includes interactive commercial pre-triggers for triggering the retrieving of corresponding interactive commercial content in advance of when a commercial spot of the commercial spots that is associated with the corresponding interactive commercial content is received in the broadcast stream; and wherein the interactive enabling device is configured to respond to the interactive program and commercial pre-triggers by executing the interactive control application to manage the retrieval of the corresponding interactive program and commercial content from the at least one interactive content server.

8. The system as recited in claim 7, wherein the, interactive enabling device is configured to respond to an interactive commercial pre-trigger that has been embedded in the enhanced program content in the broadcast stream.

9. The system as recited in claim 7, wherein said interactive enabling device is configured to respond to an interactive commercial pre-trigger by executing said interactive control application to manage the retrieval of interactive commercial content that is specified by the interactive commercial pre-trigger during a time when the interactive enabling device is receiving the enhanced program content in the broadcast stream.

10. The system as recited in claim 7, wherein the interactive enabling device is configured to respond to an interactive program pre-trigger that has been embedded in one of the commercial spots in the broadcast stream.

11. The system as recited in claim 7, wherein said interactive enabling device is configured to respond to an interactive program pre-trigger by executing said interactive control application to manage the retrieval of interactive program content that is specified by the interactive program pre-trigger during a time when the interactive enabling device is receiving the commercial spots in the broadcast stream.

12. An interactive enabling system for managing interactive program content associated with enhanced program content and interactive commercial content associated with commercial spots, the system comprising:

an interactive enabling device coupled for receiving a broadcast stream generated by a broadcast sponsor and for responding to program pre-triggers and commercial pre-triggers inserted into the broadcast stream for retrieving the interactive program and commercial content in advance of when the content is needed, said broadcast stream including the enhanced program content and the commercial spots; and at least one interactive content server coupled through a communication link for communicating with an interactive control application in the interactive enabling device;

wherein the interactive enabling device executes the interactive control application to manage the retrieval of the interactive program and commercial content in response to the program pre-triggers and commercial pre-triggers;

wherein the interactive enabling device is operable to respond to a commercial pre-trigger embedded in the enhanced program content and a program pre-trigger embedded in a commercial spot;

wherein the interactive enabling device is configured for receiving interactive program pre-triggers and commercial pre-triggers that were inserted into the broadcast stream by the broadcast sponsor at a specific time in advance of when the interactive program and commercial content is needed, based on estimates for communication link speed; and wherein the interactive program and commercial content includes a plurality of segments, each segment including multiple pre-triggers, and each pre-trigger of the multiple pre-triggers for a segment corresponding to a particular type of communication link speed.

13. The system as recited in claim 12, wherein the interactive enabling device includes a list of approved pre-triggers; and wherein the interactive control application enables the retrieval of the interactive program and commercial content only if codes embedded in the interactive program pre-triggers and commercial pre-triggers match the codes in the list of approved pre-triggers.

14. The system as recited in claim 12, further comprising:

a plurality of additional interactive enabling devices in addition to said interactive enabling device, each of said plurality of additional interactive enabling devices coupled for receiving the broadcast stream;

wherein the interactive enabling device and each of the additional interactive enabling devices includes a corresponding randomizer for randomly times-skewing the retrieval of the interactive program and commercial content in response to the interactive program pre-triggers and commercial pre-triggers.

15. The system as recited in claim 14, wherein the interactive enabling device and each of the additional interactive enabling devices are configured such that each of their corresponding randomizers randomly times-skews a beginning of a retrieval of interactive commercial content that is specified by the interactive commercial pre-trigger within an allotted time window.

16. The system as recited in claim 15, wherein the time window is a time period during which the interactive enabling device and each of the additional interactive enabling devices receive the enhanced program content in the broadcast stream.

17. The system as recited in claim 12, wherein said interactive enabling device is configured to respond to said interactive commercial pre-trigger by executing said interactive control application to manage the retrieval of interactive commercial content that is specified by the interactive commercial pre-trigger during a time when the interactive enabling device is receiving the enhanced program content in the broadcast stream.

18. The system as recited in claim 12, wherein the interactive enabling device is configured to respond to an interactive program pre-trigger that has been embedded in one of the commercial spots in the broadcast stream.

19. The system as recited in claim 12, wherein said interactive enabling device is configured to respond to an interactive program pre-trigger by executing said interactive control application to manage the retrieval of interactive program content that is specified by the interactive program pre-trigger during a time when the interactive enabling device is receiving the commercial spots in the broadcast stream.

20. The system as recited in claim 12, wherein the interactive commercial pre-trigger occurs earlier in the broadcast stream than a commercial spot of the commercial spots that is associated with the interactive commercial pre-trigger.

21. A method for managing interactive program content associated with enhanced program content and interactive commercial content associated with commercial spots, comprising:

receiving a broadcast stream, said broadcast stream including the enhanced program content in series with the commercial spots, the broadcast stream further including program pre-triggers, interactive program triggers, commercial pre-triggers, and interactive commercial triggers for retrieving the interactive program and commercial content from at least one interactive content server;

managing the retrieval of the interactive program and commercial content from the at least one interactive content server in response to the program and commercial pre-triggers, and the availability of the interactive program and commercial content in response to the interactive program and commercial triggers, wherein the interactive program and commercial content includes a plurality of segments, each segment including multiple pre-triggers, and each pre-trigger of the multiple pre-triggers for a segment corresponding to a particular type of communication link speed; and receiving and responding to the program pre-triggers, the interactive program triggers, the commercial pre-triggers, and the interactive commercial triggers embedded in the broadcast stream to ensure that the interactive program and commercial content do not overlap and interfere with each other.

22. The method as recited in claim 21, further including selectively retrieving interactive program and commercial content in response to recognized interactive program and commercial triggers.

23. The method as recited in claim 22, further including recognizing the interactive program and commercial triggers based on agreements between broadcasters and program or commercial sponsors.

24. The method as recited in claim 22, further including recognizing the interactive program and commercial triggers based on parameters embedded within the interactive program and commercial triggers.

25. The method as recited in claim 22, further including recognizing the interactive program and commercial triggers based on parameters maintained within the interactive enabling device.

26. The method as recited in claim 21, further including retrieving the interactive program and commercial content from the at least one interactive content server through a communication link or assembling the interactive program and commercial content from information in the broadcast stream.

27. The method as recited in claim 21, wherein the step of receiving comprises:

receiving a broadcast stream by each of a plurality of interactive enabling devices said broadcast stream including the enhanced program content in series with the commercial spots, the broadcast stream further including interactive program triggers and interactive commercial triggers for retrieving the interactive program and commercial content from at least one interactive content server;

wherein the step of managing comprises:

managing each of the plurality of interactive enabling devices the retrieval of the interactive program and commercial content from the at least one interactive content server in response to the interactive program and commercial triggers; and wherein the method further includes:

randomly times-skewing, by each of the plurality of interactive enabling devices, the retrieval of the interactive program and commercial content in response to the interactive program and commercial triggers.

28. The method as recited in claim 21, wherein the broadcast stream further includes interactive program pre-triggers for triggering the retrieving of corresponding interactive program content in advance of when a portion of enhanced program content of the enhanced program content that is associated with the corresponding interactive program content is received in the broadcast stream;

wherein the broadcast stream further includes interactive commercial pre-triggers for triggering the retrieving of corresponding interactive commercial content in advance of when a commercial spot of the commercial spots that is associated with the corresponding interactive commercial content is received in the broadcast stream; and wherein the method further includes:

managing the retrieval of the corresponding interactive program and commercial content from the at least one interactive content server in response to the interactive program and commercial pre-triggers.

29. The method as recited in claim 28, wherein the step of managing the retrieval of the corresponding interactive program and commercial content from the at least one interactive content server in response to the interactive program and commercial pre-triggers, comprises:

managing the retrieval of interactive program content that is specified by an interactive program pre-trigger in response to receiving the interactive program pre-trigger, said interactive program pre-trigger having been embedded in one of the commercial spots in the broadcast stream.

30. The method as recited in claim 28, wherein the step of managing the retrieval of the corresponding interactive program and commercial content from the at least one interactive content server in response to the interactive program and commercial pre-triggers, comprises:

managing the retrieval of interactive commercial content that is specified by an interactive commercial pre-trigger in response to receiving the interactive commercial pre-trigger, said interactive commercial pre-trigger having been embedded in the enhanced program content in the broadcast stream.

31. A method for managing interactive program content associated with enhanced program content and interactive commercial content associated with commercial spots, comprising:

receiving a broadcast stream generated by a broadcast sponsor and responding to program pre-triggers and commercial pre-triggers inserted into the broadcast stream for retrieving the interactive program and commercial content in advance of when the content is needed, based on estimates for communication link speed, said broadcast stream including the enhanced program content and the commercial spots; and managing the retrieval of the interactive program and commercial content in response to the program pre-triggers and commercial pre-triggers, said managing including retrieving interactive commercial content in response to receiving a commercial pre-trigger embedded in the enhanced program content, and retrieving interactive program content in response to receiving a program pre-trigger embedded in a commercial spot, wherein the interactive program and commercial content includes a plurality of segments, each segment including multiple pre-triggers, and each pre-trigger of the multiple pre-triggers for a segment corresponding to a particular type of communication link speed.

32. The method as recited in claim 31, further including: maintaining a list of approved pre-triggers; and enabling the retrieval of the interactive program and commercial content only if codes embedded in the interactive program pre-triggers and commercial pre-triggers match the list of approved pre-triggers.

33. The method as recited in claim 31, wherein the step of receiving comprises:

receiving a broadcast stream by each of a plurality of interactive enabling devices, said broadcast stream generated by a broadcast sponsor; and responding, by each of the plurality of interactive enabling devices, to interactive program pre-triggers and commercial pre-triggers inserted into the broadcast stream for retrieving the interactive program and commercial content in advance of when the content is needed, said broadcast stream including the enhanced program content and the commercial spots;

wherein the step of managing comprises:

managing, by each of the plurality of interactive enabling devices, the retrieval of the interactive program and commercial content in response to the interactive program pre-triggers and commercial pre-triggers, said managing including retrieving interactive commercial content in response to receiving an interactive commercial pre-trigger that has been embedded in the enhanced program content in the broadcast stream; and wherein the method further includes:

randomly time-skewing, by each of the plurality of interactive enabling devices, the retrieval of the interactive program and commercial content in response to the interactive program pre-triggers and commercial pre-triggers.

34. The method as recited in claim 31, wherein the step of managing includes:

managing the retrieval of interactive commercial content specified by an interactive commercial pre-trigger in response to receiving the interactive commercial pre-trigger, said interactive commercial pre-trigger having been embedded in the enhanced program content in the broadcast stream, said retrieval of the interactive commercial content specified by the interactive commercial pre-trigger occurring during a time when the enhanced program content is received in the broadcast stream.

35. The method as recited in claim 34, wherein the step of managing further includes:

managing the retrieval of interactive program content in response to receiving an interactive program pre-trigger that has been embedded in one of the commercial spots in the broadcast stream.

36. The method as recited in claim 35, wherein the step of managing the retrieval of interactive program content in response to receiving an interactive program pre-trigger that has been embedded in one of the commercial spots in the broadcast stream, includes:

managing the retrieval of interactive program content specified by an interactive program pre-trigger in response to receiving the interactive program pre-trigger, said interactive program pre-trigger having been embedded in a commercial spot of the commercial spots in the broadcast stream, said retrieval of the interactive program content specified by the interactive program pre-trigger occurring during a time when the commercial spot is received in the broadcast stream.

* * * * *

UNITED STATES PATENT AND TRADEMARK OFFICE
CERTIFICATE OF CORRECTION

| | |
|---|---|
| PATENT NO. | : 7,584,491 B2 |
| APPLICATION NO. | : 09/843589 |
| DATED | : September 1, 2009 |
| INVENTOR(S) | : Bruckner et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1704 days.

Signed and Sealed this

Fourteenth Day of September, 2010

David J. Kappos
*Director of the United States Patent and Trademark Office*